(12) United States Patent
Chang

(10) Patent No.: US 11,434,123 B2
(45) Date of Patent: Sep. 6, 2022

(54) TOUCHLESS WATER DISPENSING CONTROL SYSTEM FOR WATER SUPPLY DEVICE AND WATER DISPENSING CONTROL METHOD USING SAME

(71) Applicant: YOUNGONE Corporation, Incheon (KR)

(72) Inventor: Seok Eun Chang, Incheon (KR)

(73) Assignee: YOUNGONE CORPORATION, Incheon (KR)

( * ) Notice: Subject to any disclaimer, the term of this patent is extended or adjusted under 35 U.S.C. 154(b) by 7 days.

(21) Appl. No.: 17/112,309

(22) Filed: Dec. 4, 2020

(65) Prior Publication Data

US 2022/0119241 A1   Apr. 21, 2022

(30) Foreign Application Priority Data

Oct. 21, 2020   (KR) .................. 10-2020-0136481
Oct. 21, 2020   (KR) .................. 10-2020-0136485

(51) Int. Cl.
| | |
|---|---|
| *B67D 1/08* | (2006.01) |
| *B67D 1/00* | (2006.01) |
| *B67D 1/12* | (2006.01) |
| *G05B 19/4155* | (2006.01) |
| *G01V 3/08* | (2006.01) |
| *G06V 40/20* | (2022.01) |

(52) U.S. Cl.
CPC .......... *B67D 1/0888* (2013.01); *B67D 1/0003* (2013.01); *B67D 1/1277* (2013.01); *G01V 3/08* (2013.01); *G05B 19/4155* (2013.01); *G06V 40/20* (2022.01); *G05B 2219/2625* (2013.01)

(58) Field of Classification Search
CPC ...... G01V 3/08; B67D 1/0003; B67D 1/0888; B67D 1/1277; G05B 19/4155; G05B 2219/2625
See application file for complete search history.

(56) References Cited

U.S. PATENT DOCUMENTS

| | | | | |
|---|---|---|---|---|
| 5,694,653 | A * | 12/1997 | Harald ............... | E03C 1/057 |
| | | | | 4/678 |
| 6,688,134 | B2 * | 2/2004 | Barton ............... | B67D 1/00 |
| | | | | 141/351 |
| 8,089,473 | B2 * | 1/2012 | Koottungal ......... | H03K 17/975 |
| | | | | 345/173 |

(Continued)

*Primary Examiner* — Timothy L Maust
(74) *Attorney, Agent, or Firm* — Kile Park Reed & Houtteman PLLC

(57) ABSTRACT

Proposed is a touchless water dispensing control system, wherein water dispensing operation is possible without requiring physical contact between a user and a water supply device. In an embodiment, proposed are: a touchless water dispensing control system for a water supply device, the water dispensing control system including at least two water dispensing valves, a touchless locking operation module detecting an approaching object, a touchless water dispensing operation module detecting the approaching object, and a controller comparing a user's gesture patterns received from each of the locking operation module and the water dispensing operation module with a preset condition and controlling operation of the water dispensing valves on the basis of a result of comparison; and a water dispensing control method using the same.

4 Claims, 12 Drawing Sheets

(56) References Cited

U.S. PATENT DOCUMENTS

| | | | | |
|---|---|---|---|---|
| 8,118,240 B2* | 2/2012 | Rodenbeck | ............ | E03C 1/0404 |
| | | | | 239/407 |
| 8,365,767 B2* | 2/2013 | Davidson | ............ | G05D 23/1393 |
| | | | | 137/559 |
| 8,418,993 B2* | 4/2013 | Chen | .................... | G05D 23/193 |
| | | | | 700/282 |
| 8,516,628 B2* | 8/2013 | Conroy | .................... | E03C 1/05 |
| | | | | 4/559 |
| 8,944,105 B2* | 2/2015 | Rodenbeck | ............. | E03C 1/057 |
| | | | | 137/801 |
| 8,976,158 B2* | 3/2015 | Eriksson | ................. | F24C 7/083 |
| | | | | 345/175 |
| 9,243,756 B2* | 1/2016 | Davidson | ............... | E03C 1/055 |
| 9,458,612 B2* | 10/2016 | Thomas | ................ | F16K 31/082 |
| 9,783,964 B2* | 10/2017 | Thompson | ............... | E03C 1/057 |
| 10,323,393 B2* | 6/2019 | Thompson | ............... | E03C 1/057 |
| 10,941,548 B2* | 3/2021 | Sawaski | .................... | G01V 3/00 |
| 11,118,338 B2* | 9/2021 | Schibur | ................... | E03D 11/02 |
| 2021/0361126 A1* | 11/2021 | Tran | ....................... | F16M 11/22 |
| 2021/0380391 A1* | 12/2021 | Defazio | ............... | B67D 1/0884 |

* cited by examiner

TOUCHLESS WATER DISPENSING CONTROL SYSTEM FOR WATER SUPPLY DEVICE AND WATER DISPENSING CONTROL METHOD USING SAME

CROSS REFERENCE TO RELATED APPLICATION

The present application claims priority to Korean Patent Application No. 10-2020-0136481, filed Oct. 21, 2020 and Korean Patent Application No. 10-2020-0136485, filed Oct. 21, 2020, the entire contents of which is incorporated herein for all purposes by this reference.

BACKGROUND OF THE INVENTION

Field of the Invention

The present disclosure relates to a water supply device that provides hot water, purified water, or cold water. More particularly, the present disclosure relates to a touchless water dispensing control system and a water dispensing control method using the same, wherein water dispensing operation is possible without requiring physical contact between a user and a water supply device.

Description of the Related Art

A water supply device is a device that supplies hot or cold water to a user by heating or cooling supplied water. In a water supply device, generated hot or cold water is stored and then is provided to a user through a valve that is opened by means of a user's manipulation.

Multi-use facilities, such as hospitals, banks, airports, libraries, and schools, are equipped with water supply devices to provide convenience to users. As many people share these water supply devices to drink water, there is a high possibility that pathogens, etc., on the device can cause contamination and be spread from one person to another during operation of the valve for water dispensing. Therefore, it is necessary to disinfect an operation button of the valve at frequent intervals, which is very cumbersome, and it is not easy to disinfect the operation button after each use by a user.

Meanwhile, hot water provided from the water supply device has a high temperature, so there is a possibility of a user getting burned. In particular, there are cases in which hot water is unintentionally dispensed by children, the elderly, and the mentally and physically impaired, due to mishandling, etc. Thus, an additional condition is applied on dispensing of hot water, so that hot water is not dispensed by only intuitive operation of a hot water valve.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide a water supply device that enables a user to dispense water without the need of direct contact with the water supply device. Another objective of the present disclosure is to apply additional conditions on dispensing of hot water while realizing water dispensing in a touchless manner, thereby improving safety in use.

Other detailed objectives of the present disclosure will be apparent to those of ordinary skill in this technical field from the following detailed description.

In order to achieve the above objective, in an embodiment, there is provided a touchless water dispensing operation module installed inside a water dispensing operation panel for water dispensing operation, the water dispensing operation module including: a circuit board on which a touch sensor chip is installed; and a plurality of object detection units connected to capacitive input terminals of the touch sensor chip, and erected toward a cover of the water dispensing operation panel, wherein each of the object detection units may include: a support oriented toward the cover of the water dispensing operation panel; and a receiving pad connected to an end of the support, and formed in a surface shape conforming to an inner surface of the cover.

Furthermore, the plurality of object detection units may include a first object detection unit disposed at an intermediate position, and a second object detection unit and a third object detection unit disposed at left and right sides of the first object detection unit, wherein an object recognition distance of the first object detection unit from a surface of the cover may be shorter than that of the second object detection unit or the third object detection unit from the surface of the cover.

Meanwhile, the water dispensing operation module may further include a controller connected to the touch sensor chip to receive whether an object is detected by the first to third object detection units, and to evaluate a user's gesture pattern, wherein when an object is detected by the second object detection unit or the third object detection unit and the object is not detected by the first object detection unit, the controller may determine that a correct gesture pattern is detected by the second object detection unit or the third object detection unit; and when the object is detected by the first object detection unit, the controller may determine that a gesture pattern is incorrect, regardless of whether the object is detected by the second object detection unit or the third object detection unit.

Furthermore, the receiving pad of the first object detection unit may have a strip shape extending from a position adjacent to the support of the second object detection unit to the support of the third object detection unit, and the receiving pad of each of the second object detection unit and the third object detection unit may not be in contact with the receiving pad of the first object detection unit, with a larger area than the same.

In another embodiment, an auxiliary receiving pad may be located at the end of the support of each of the first, second, and third object detection units, the respective auxiliary receiving pads are connected to the support of the first object detection unit by electric wires, and the receiving pad of each of the second object detection unit and the third object detection unit may not be in contact with the auxiliary receiving pad, with a larger area than the same.

There is further provided a touchless water dispensing control system for a water supply device, the water dispensing control system including: at least two water dispensing valves; a touchless locking operation module detecting an approaching object; a touchless water dispensing operation module detecting the approaching object; and a controller comparing a user's gesture patterns received from each of the locking operation module and the water dispensing operation module with a preset condition and controlling operation of the water dispensing valves on the basis of a result of comparison.

Furthermore, the water dispensing operation module may include first to third object detection units disposed apart from each other at predetermined intervals, and each of which detects the object that approaches within a predetermined distance, and the locking operation module may include a fourth object detection unit installed to be oriented in a direction different from that of the water dispensing operation module, and detecting the object that approaches within a predetermined distance.

There is still further provided a water dispensing control method for a water supply device including at least two water dispensing valves, a water dispensing operation module including first to third object detection units for detecting an approaching object, a locking operation module including a fourth object detection unit for detecting the approaching object, and a controller for comparing a user's gesture pattern received from each of the locking operation module and the water dispensing operation module with a preset condition and controlling operation of the water dispensing valves on the basis of a result of comparison, the water dispensing control method including: switching, when the object is detected by the fourth object detection unit of the locking operation module for equal to or greater than a predetermined period of time, a water dispensing limit mode in which operation of the water dispensing valves is suppressed to a water dispensing mode in which the water dispensing valves are allowed to be opened and closed through the water dispensing operation module; and switching, when the object is not detected by each of the second and third object detection units within a predetermined period of time after switching to the water dispensing mode, the water dispensing mode to the water dispensing limit mode again.

Meanwhile, when the object is detected by the second object detection unit for equal to or greater than the predetermined period of time after the water dispensing mode is activated, and when the object is detected by the third object detection unit, any one of the water dispensing valves may be opened while the object may be detected by the second object detection unit.

Meanwhile, after the object is detected by the second object detection unit, when the object is detected by the first object detection unit having a shorter object detection distance than each of the second and third object detection units, the water dispensing mode may be switched to the water dispensing limit mode.

Furthermore, when the object is not detected by the third object detection unit within the predetermined period of time after the object is detected by the second object detection unit, the water dispensing mode may be switched to the water dispensing limit mode.

Meanwhile, when the object is detected by the third object detection unit for equal to or greater than the predetermined period of time after the water dispensing mode is activated, and when the object is not detected by the first object detection unit having a shorter object detection distance than the third object detection unit, any one of the water dispensing valves may be opened while the object may be detected by the third object detection unit.

According to the embodiment of the present disclosure, by enabling the user to dispense water without the need of physical contact with the water supply device, it is possible to solve the problem of spreading pathogens through a water dispensing button or the like. In addition, by applying additional conditions on dispensing of hot water, it is possible to improve safety in use.

Other effects of the present disclosure will be apparent to those of ordinary skill in this technical field from the following detailed description or during of the course of implementing the present disclosure.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
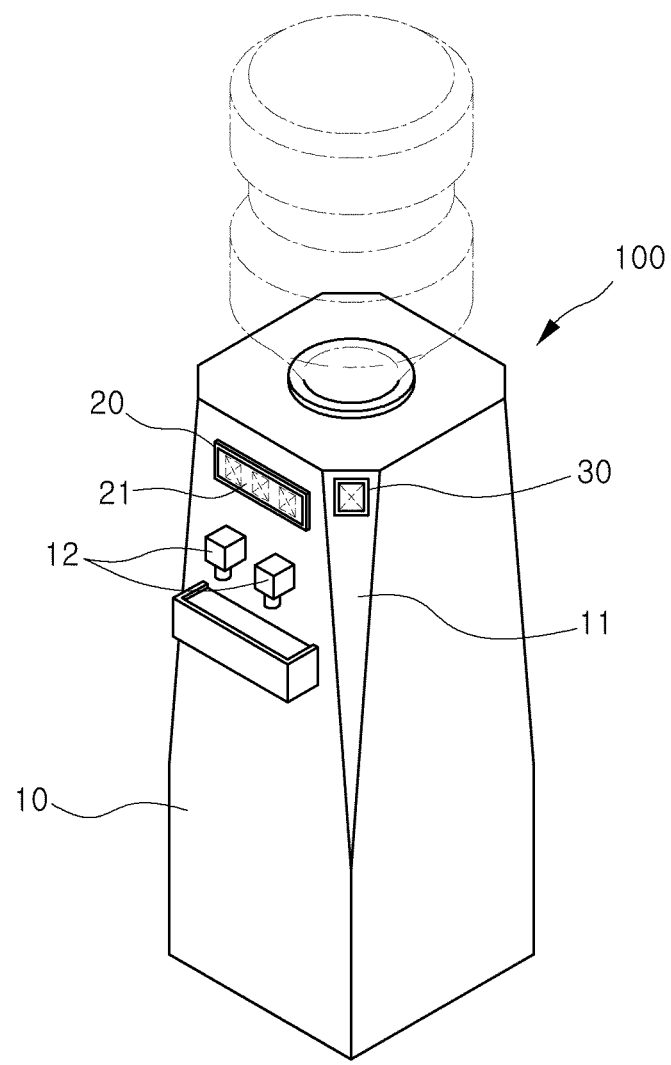
FIG. 1 is a schematic perspective view illustrating a water supply device according to an embodiment of the present disclosure.

Hereinafter, a configuration, function, and operation of a touchless water dispensing control module and a water supply device including the same according to the present disclosure will be described with reference to the accompanying drawings. The same reference numerals are used throughout the different drawings to designate the same or similar components.

It will be further understood that, although the terms such as 'a first ~' and 'a second ~' are used only for the purpose for distinguishing constitutive elements having the same technical meaning for convenience. For example, any one constitutive element may be arbitrarily referred as 'a first constitutive element' or 'a second constitutive element'.

The accompanying drawings illustrate adopted embodiments of the present disclosure, and the embodiments of the present disclosure should not be construed as limited to the accompanying drawings. From a viewpoint of those of ordinary skill in the art, when a part or all of the illustrations in the drawings is interpreted as irrelevant to a form, a shape, or a sequence inevitably required for the practice of the present disclosure, the present disclosure set forth by the appended claims is not limited thereby.

FIG. 1 is related to a water supply device equipped with a touchless water dispensing operation module according to an embodiment of the present disclosure.

The water supply device 100 to which the present disclosure is applied may be a generally widely used cold or hot water machine, a water purifier, a water softener, etc.

The water supply device 100 includes means for treating supplied water suitable for drinking purposes. Examples of these means may include a heating means such as an electric heater for providing hot water, a hot water tank for storing heated water, and a control means for measuring water temperature and driving the electric heater. A further example may include at least one of various known water treatment means, such as a cooling means for providing cold water, a carbonated mixing means for generating carbonated water, and a raw material mixing means for providing a beverage having a specific taste.

The water supply device 100 to which the present disclosure is applied may include at least two water dispensing valves 12.

The respective water dispensing valves 12 may be configured to discharge different types of treated water. For example, hot water may be dispensed from one of the water dispensing valves 12, and cold water may be dispensed from the remaining one of the water dispensing valves 12.

On the other hand, at least three the water dispensing valves may be provided, and each of the water dispensing valves may be configured to discharge any one of various types of treated water, such as carbonated water, room temperature water, juice, beer, ice, etc., in addition to hot water and cold water.

Hereinafter, it will be described as an example that the water supply device 100 includes a pair of water dispensing valves 12, and the water dispensing valves 12 dispense hot water and cold water, respectively (hereinafter, the water dispensing valve for dispensing hot water is referred to as a hot water dispensing valve, and the water dispensing valve for dispensing cold water is referred to as a cold water dispensing valve.

A housing of a water supply device greatly varies in appearance depending on industrial design needs. In the illustrated embodiment, a polyhedral housing 10 is illustrated as an example. Conventionally, water dispensing valves are provided on a front surface of the housing, and a water dispensing operation panel for water dispensing operation is provided near the water dispensing valves.

FIG. 1 illustrates a typical structure of the water supply device 100 in which the pair of water dispensing valves 12 are located on a front surface of the housing 10 of the water supply device 100.

The water dispensing operation panel 20 includes a cover 21 assembled in a mounting hole formed in the housing 10, and a water dispensing operation module 22 located inside the cover 21 so as not to be exposed outside. The cover 21 may be made of a plastic injection-molded material, and since the water dispensing operation module 22 is covered by the cover 21, the water dispensing operation module 22 is not seen by a user.

Although not illustrated, information necessary for the water dispensing operation may be presented on the cover 21 of the water dispensing operation panel 20. For example, a figure or a guidance word that introduces the water dispensing operation may be printed on the cover 21 to help the user distinguish between cold water and hot water, or to explain to the user how to dispense water.

Meanwhile, the water dispensing operation module 22 is a means for detecting an approaching object, such as an approaching palm, to thereby enable the user to dispense water without direct contact with the cover 21.

The water dispensing operation module 22 operated in a touchless manner has an effect of preventing the spread of pathogens through the surface of the water dispensing operation panel 20. Thus, it is possible to prevent the spread of infectious diseases in a place where a large number of people are expected to share the water supply device 100.

Meanwhile, a locking operation panel 30 is provided at a position away from the water dispensing operation panel 20.

Referring to FIG. 1, the locking operation panel 30 is located on an edge garnish 11 at an edge of the housing 10. The locking operation panel 30 includes a cover exposed outside of the housing 10, and a locking operation module 31 located inside the cover to detect an object approaching the cover. Here, the structure and operation method of the cover and the locking operation module 31 may be substantially the same as those of the water dispensing operation panel 20.

The locking operation panel 30 is utilized as a means for switching between deactivation and activation of a certain mode of a water dispensing control system.

In detail, the water dispensing control system may be configured such that the water supply device 100 is operated to switch between in a water dispensing limit mode in which the water dispensing operation through the water dispensing operation panel 20 is not allowed, and a water dispensing mode in which water dispensing operation through the water dispensing operation panel 20 is allowed, and the water dispensing limit mode is switched to the water dispensing mode when an object is detected by the locking operation panel 30. In other words, when an object is detected by the locking operation panel 30, the water dispensing mode is activated.

Furthermore, the water dispensing operation module 22 and the locking operation module 31 may be configured such that the positions thereof are physically distinguished, thereby enabling the user to clearly distinguish between a release operation of the water dispensing limit mode and a gesture pattern input for water dispensing.

In the illustrated embodiment, the water dispensing operation panel 20 is located on the front surface of the housing 10, and the locking operation panel 30 is located at the edge garnish 11 which is oriented at an angle with respect to a front direction. Alternatively, the locking operation panel 30 may be located on any one of a left surface, a right surface, and an upper surface other than the front surface of the housing 10.

With such a configuration, the water dispensing operation module 22 detects an object approaching the front surface of the housing 10, and the locking operation module 31 detects an object approaching the edge of the housing 10 at an angle.

As such, as the water dispensing operation module 22 and the locking operation module 31 are disposed to be oriented in different directions, it is possible to prevent a case where the two modules 22 and 31 simultaneously react to one gesture operation.

Meanwhile, the water supply device 100 includes a controller 70 that compares a user's gesture pattern input through the locking operation module 31 or the water dispensing operation module 22 with a preset condition, and controls the operation of the water dispensing valves 12 on the basis of a result of comparison. If the provision of the locking operation panel 30 and the water dispensing limit mode is omitted in the water supply device 100, the controller 70 performs water dispensing operation control only with a gesture pattern input through the water dispensing operation module 22.

Furthermore, the controller 70 may supply power to a power consuming device for heating or cooling water, or may control the operation of a solenoid valve for refrigerant flow control and the operation of a display that displays status information such as water temperature, water dispensing operation, etc.

To this end, the controller 70 includes an input terminal for receiving electric signals from sensors provided in the water dispensing operation module 22, a memory device for storing a control algorithm, a power management module, a processing unit, and the like.

The hardware configuration and basic control algorithm of the controller 70 may be substantially the same as the configuration and operation method of a controller of a cold and hot water dispenser, etc., that is already commercially available.

FIGS. 2 to 5 are related to a water dispensing operation module according to an embodiment of the present disclosure.

The water dispensing operation module 22 according to the embodiment is connected to a circuit board 50 on which a touch sensor chip 40 is installed, and a plurality of object detection units 60A, 60B, and 60C connected to capacitive input terminals of the touch sensor chip 40 and erected toward the cover 21 of the water dispensing operation panel 20.

Here, the touch sensor chip 40 is referred to as an electrostatic touch sensor IC, a touch controller chip, a capacitive sensor, etc., and is used to implement a touch pad by having a capacity sensor. The touch sensor chip 40 is a commercially available chip, such as FDC1004EVM from Texas Instruments, TS04P from ADSemiconductor, etc. The configuration of the circuit board 50 on which the touch sensor chip 40 is installed and transmitting an output of the touch sensor chip 40 to the controller 70 may be the same as a known configuration.

The circuit board 50 is coupled to and fixed to a structure inside the housing 10. In addition, although not illustrated, a light-emitting diode (LED) element for providing backlight may be installed on the circuit board 50.

The object detection units 60A, 60B, and 60C protrude from the circuit board 50 toward the cover 21 of the water dispensing operation panel 20. Each of the object detection units 60A, 60B, and 60C includes a support 61 protruding from the circuit board 50, and a plate-shaped receiving pad 62 connected to an end of the support 61.

A front end of each of the object detection units 60A, 60B, and 60C is located directly inside the cover 21 of the water dispensing operation panel 20, so that a change in capacity as an object (mainly a user's finger or palm) closely approaches the front end of a corresponding object detection unit is received and transmitted to the touch sensor chip 40.

Figure 2:
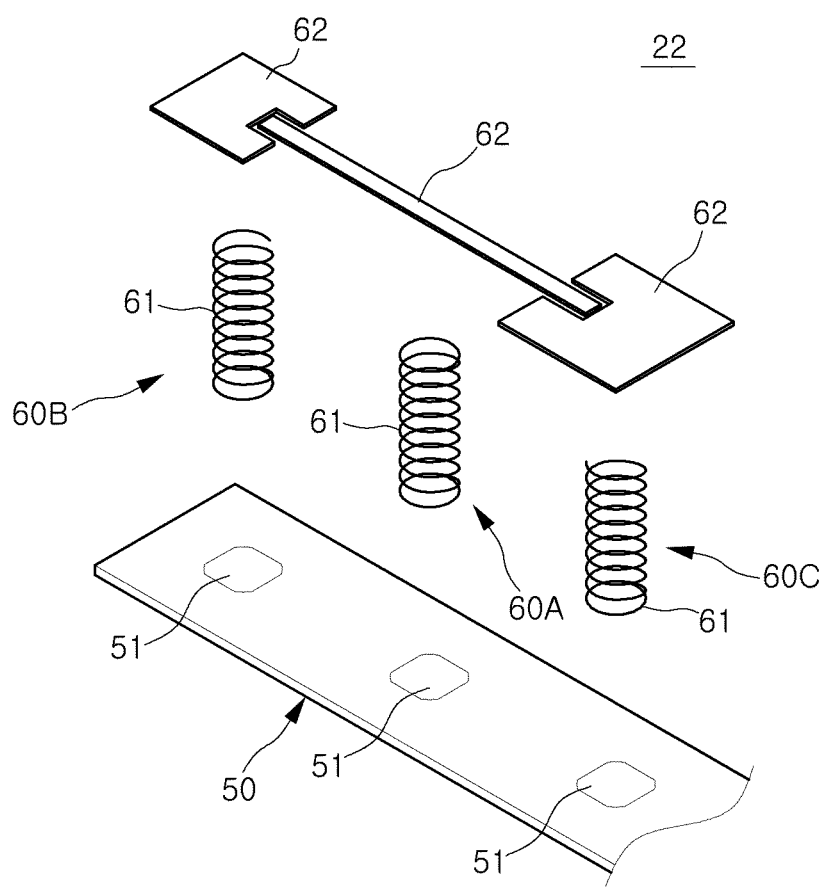
FIG. 2 an exploded view illustrating a main part of a water dispensing operation module employed in the embodiment illustrated in FIG. 1.

Referring to FIG. 2, a terminal seat 51 on which the support 61 of each of the object detection units 60A, 60B, and 60C is mounted is provided on the circuit board 50.

The support 61 is a member erected from a flat surface of the circuit board 50, and in the illustrated embodiment, is a spring made of a conductive material. Alternatively, the support 61 may be replaced with a conductive metal structure such as a copper pillar, or an electric wire.

As the support 61 is configured as a spring, the receiving pad 62 coupled to the end of the support 61 is in intimate contact with an inner surface of the cover 21. In other words, the spring is compressed between the circuit board 50 and the cover 21 and pushes the receiving pad 62 toward the inner surface of the cover 21, which ensures that the receiving pad 62 is always maintained in intimate contact with the inner surface of the cover 21 in spite of manufacturing tolerances of the housing 10 and the cover 21 or clearance due to assembly.

The receiving pad 62 may be made of a conductive sheet or a conductive metal plate in a surface shape conforming to the inner surface of the cover 21, and further, may be configured to be bendable. For example, the material of the receiving pad 62 may be a conductive nickel fabric. The receiving pad 62 is electrically connected to the end of the support 61.

Figure 3:
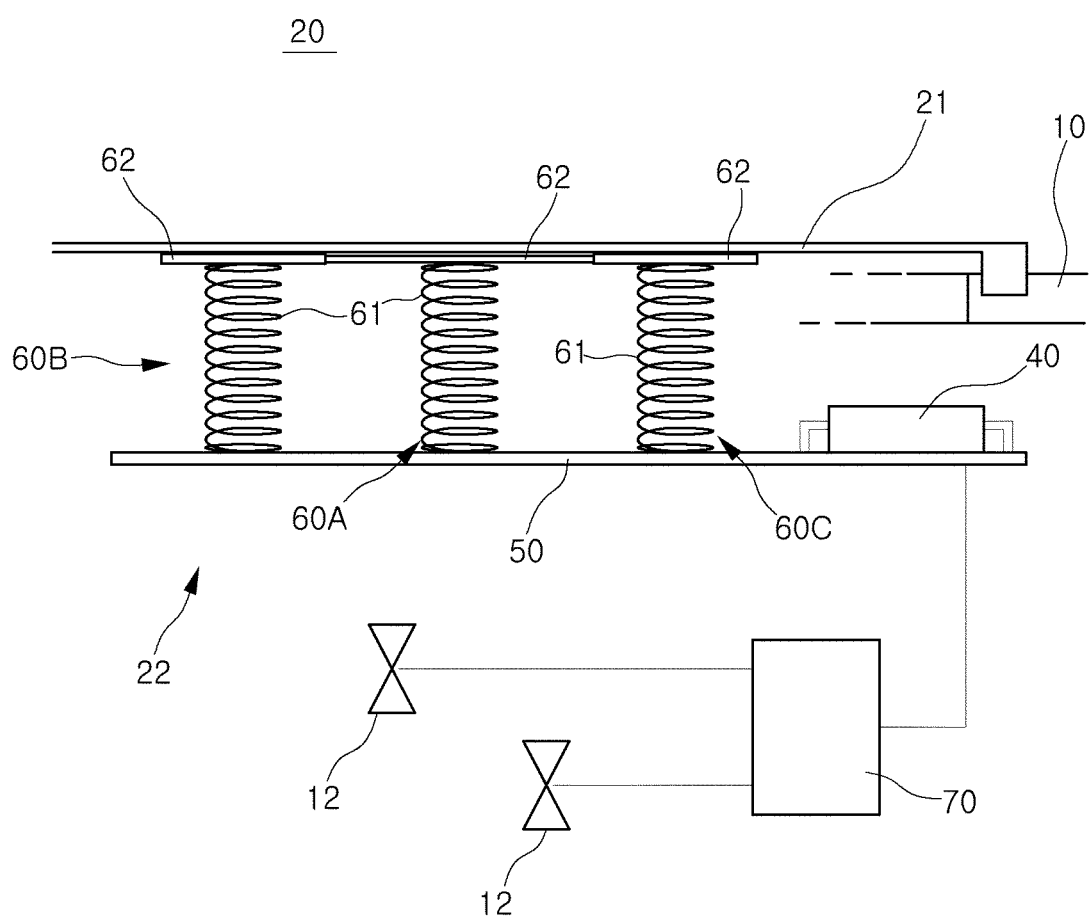
FIG. 3 is a plan view illustrating the water dispensing operation module illustrated in FIG. 2.

In the embodiment illustrated in FIGS. 2 to 3, three object detection units are sequentially disposed in a parallel relationship. Of these, one disposed at an intermediate position is referred to as a first object detection unit 60A, and ones disposed at left and right sides of the first object detection unit 60A are referred to as a second object detection unit 60B and a third object detection unit 60C, respectively.

As the receiving pad 62 increases in area, a detection range in which the object detection units 60A, 60B, and 60C can detect an object increases.

The area of the receiving pad 62 of the first object detection unit 60A may be smaller than that of the receiving pad 62 of the second object detection unit 60B or the receiving pad 62 of the third object detection unit 60C, so that an object recognition distance of the first object detection unit 60A from a surface of the cover 21 may be shorter than that of the second object detection unit 60B or the third object detection unit 60C from the surface of the cover 21.

Figure 4:
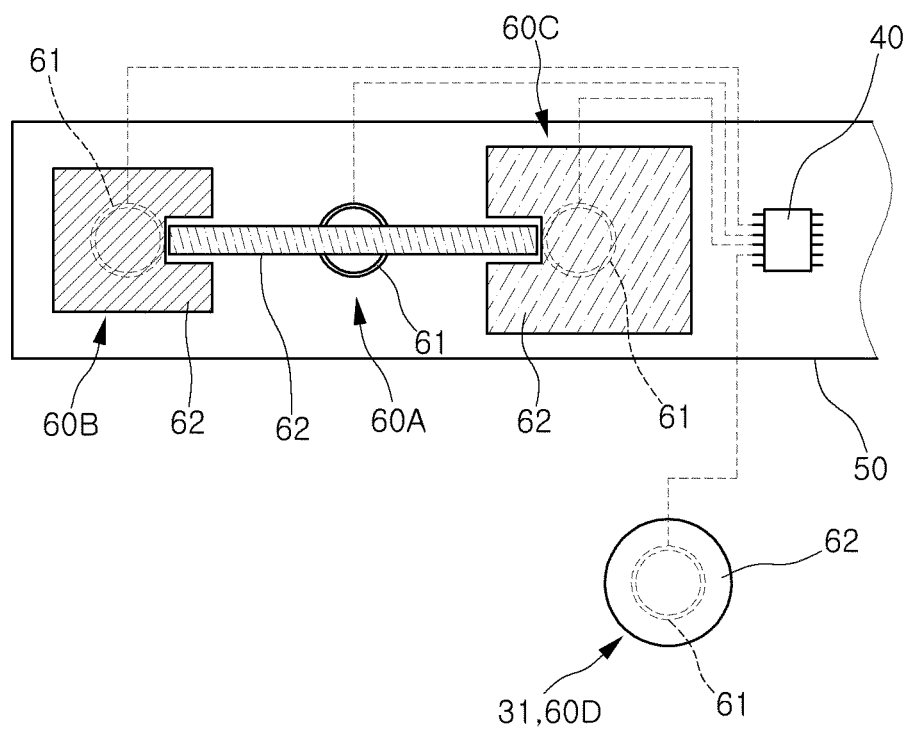
FIG. 4 is a front view illustrating the water dispensing operation module illustrated in FIG. 2.

In detail, referring to FIGS. 2 and 4, the receiving pad 62 of the first object detection unit 60A has a narrow strip shape, and is disposed long so that opposite ends thereof are oriented toward the second object detection unit 60B and the third object detection unit 60C. The receiving pad 62 of the first object detection unit 60A is not electrically connected to the support 61 of the second object detection unit 60B or the support 61 of the third object detection unit 60C.

Furthermore, an insulator may be applied under the receiving pad 62 of the first object detection unit 60A so that the first object detection unit 60A is electrically insulated from the second and third object detection units 60B and 60C, and may be configured to have a length that passes through central portions of the second object detection unit 60B and the third object detection unit 60C.

The receiving pad 62 of the second object detection unit 60B or the receiving pad 62 of the third object detection unit 60C has a quadrangular shape having substantially the same length on each opposite sides, with a cutout portion for avoiding contact with the receiving pad 62 of the first object detection unit 60A.

Since the receiving pad 62 of the second object detection unit 60B or the receiving pad 62 of the third object detection unit 60C has a larger area than the receiving pad 62 of the first object detection unit 60A, each of the second object detection unit 60B and the third object detection unit 60C has a longer object detection distance than the first object detection unit 60A.

Meanwhile, the receiving pads 62 of the second and third object detection units 60B and 60C have a substantially square shape, and are configured such that the area of the receiving pad 62 of the third object detection unit 60C is larger than that of the receiving pad 62 of the second object detection unit 60B. Accordingly, the third object detection unit 60C having a larger area than the second object detection unit 60B has a longer object detection distance than the second object detection unit 60B.

Figure 5:
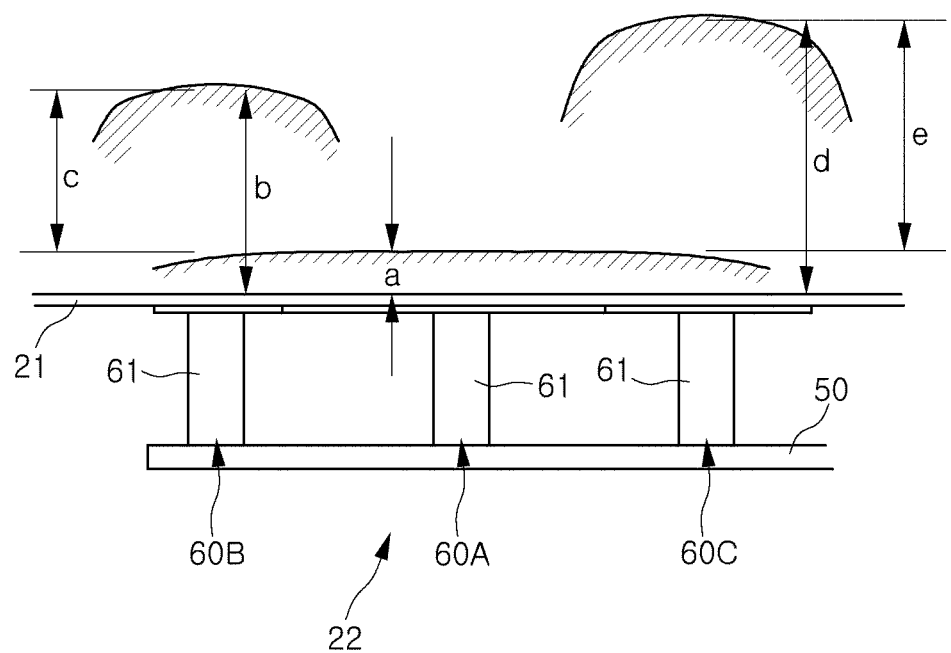
FIG. 5 is a plan view illustrating a schematic detection range of the water dispensing operation module illustrated in FIG. 2.

FIG. 5 schematically illustrates an object detection range according to the first to third object detection units 60A to 60C. In this figure, a detection range is schematically illustrated for each of the object detection units 60A, 60B, and 60C, and a distance from the surface of the cover 21 is represented as an object detection distance.

The second object detection unit 60B may detect an object located at a distance closer than a distance b, and the third object detection unit 60C may detect an object located at a distance closer than a distance d.

Using this object detection situation, when the second object detection unit 60B detects an object, the controller 70 may open any one of the water dispensing valves 12. In addition, when the third object detection unit 60C detects an object, the controller 70 may open a remaining one of the water dispensing valves 12.

At this time, compared to dispensing of cold water or purified water, hot water imposes a greater risk of safety accidents, so strict conditions may be applied on dispensing of hot water. In other words, object detection in the second object detection unit 60B having a short object detection distance, and an opening operation of the hot water dispensing valve 12 may be performed in conjunction with each other.

Meanwhile, since the receiving pad 62 of the first object detection unit 60A is formed long in the left-and-right direction, an object detection section having a shape that extends wide from a front portion of the cover 21 in the left-and-right direction. In addition, since the receiving pad 62 of the first object detection unit 60A has a relatively smaller area than the receiving pad 62 of each of the second and third object detection units 60B and 60C, the first object detection unit 60A has a shorter object detection distance than each of the second and third object detection units 60B and 60C.

An object approaching over the second object detection unit 60B may be detected by both the first and second object detection units 60A and 60B according to a distance from the cover 21, or may not be detected by the first object detection unit 60A, but only by the second object detection unit 60B. Similarly, an object approaching over the third object detection unit 60C may be detected by both the first and third object detection units 60A and 60C according to a distance from the cover 21, or may be detected only by the third object detection unit 60C.

This enables the controller 70 to distinguishably recognize four cases illustrated in Table 1 below.

TABLE 1

| Classification | Second object detection unit | First object detection unit | Third object detection unit |
| --- | --- | --- | --- |
| Case 1 | Detected | Detected | |
| Case 2 | Detected | Non-detected | |
| Case 3 | | Detected | Detected |
| Case 4 | | Non-detected | Detected |

Referring to FIG. 5, case 1 and case 3 are situations detected by the first object detection unit 60A having an object detection distance a. These are states in which a user's finger or the like approaches the first object detection unit 60A within the distance a from the cover 21 of the water dispensing operation panel 20, or is in contact with the surface of the cover 21.

If the area of the receiving pad 62 of the first object detection unit 60A is properly designed so that the object detection distance a of the first object detection unit 60A is about 1 cm, a situation in which an object is detected by the first object detection unit 60A may be estimated that a user's body is in contact with the surface of the cover 21.

In this situation in which the object is detected by the first object detection unit 60A, the user's gesture pattern may be ignored. This is to prevent water from being dispensed in a situation in which a user's hand or the like is in contact with the water dispensing operation panel 20, which reminds the user that water dispensing is allowed only when the user is not in contact with the cover 21. In addition, it prevents unintended water dispensing in the case of cleaning the cover 21 of the water dispensing operation panel 20 with a rag or the like.

Meanwhile, case 2 and case 4 are situations in which an object stays at a position away from the cover 21. These may be conditions that the controller 70 recognizes that a gesture pattern is normal.

Case 2 is a situation detected by the second object detection unit 60B, in which the object stays within a range c that is defined between a position closer than a distance b and a position away by the distance a from the cover 21. This is a state in which a user's hand or the like is within the range c while not in contact with the cover 21.

Similarly, case 4 is a situation detected by the third object detection unit 60C, in which an object stays within a range e that is defined between a position closer than a distance d and a position away by the distance a from the cover 21.

The controller 70 may classify the four cases of Table 1 and evaluate the user's gesture pattern. For example, the controller 70 opens the hot water dispensing valve 12 in case 2, opens the cold water dispensing valve 12 in case 4, and does not operate the water dispensing valves 12 in case 1 and case 3.

In other words, when an object is detected by the second object detection unit 60B or the third object detection unit 60C and the object is not detected by the first object detection unit 60A, the controller 70 determines that a correct gesture pattern is detected by the second object detection unit 60B or the third object detection unit 60C, and thereby performs set operation control such as opening a corresponding water dispensing valve 12.

On the other hand, when an object is detected by the first object detection unit 60A, the controller 70 determines that a gesture pattern is incorrect, regardless of whether the object is detected by the second object detection unit 60B or the third object detection unit 60C. In this case, the controller 70 may stop the operation of the water dispensing valves 12 or allow switching to the water dispensing limit mode. Furthermore, the controller 70 may display, on a display means or the like, information indicating that the user's gesture is incorrect.

As described above, by adding a condition that the user is required not to be in contact with the surface of the cover 21 to a gesture pattern condition for opening the water dispensing valves 12, there is an effect of enforcing non-contact with the cover 21 for the water dispensing operation. In other words, by requiring the user to approach within a predetermined range in front of the water dispensing operation panel 20 to achieve the water dispensing purpose, the problem that pathogens, etc., spread among people as many people come into contact with the cover 21 is prevented.

Since the water dispensing operation is actively suppressed when an object is detected by the first object detection unit 60A, the first object detection unit 60A is used as a lower limit of distance reference for setting a correct detection range in the second object detection unit 60B or the third object detection unit 60C.

Furthermore, since the first object detection unit 60A positioned between the second object detection unit 60B or the third object detection unit 60C has the long receiving pad 62 extending over the second and third object detection units 60B and 60C, the first object detection unit 60A secures a detection area with the relatively uniform distance a to the front of the second and third object detection units 60B and 60C. Accordingly, the first object detection unit 60A may function as the lower limit of the distance reference in both the second and third object detection units 60B and 60C.

In another embodiment not illustrated, when room temperature water, etc., which are relatively less likely to cause safety accidents compared to hot water, is dispensed, the function of the first object detection unit 60A as the lower limit of the distance reference may be deleted. In other words, when an object is detected within a range within a maximum object detection distance from the cover 21 by the second object detection unit 60B or the third object detection unit 60C, a corresponding water dispensing valve 12 may be opened.

Referring to FIG. 4 again, a fourth object detection unit 60D provided in the locking operation module 31 is illustrated. The fourth object detection unit 60D also includes a support 61 and a receiving pad 62, and the support 61 is connected to a capacitive input terminal of the touch sensor chip 40.

Therefore, when the user takes his/her hand close to the locking operation panel 30, the fourth object detection unit 60D detects the hand (object) and transmits a result of detection to the controller 70. Then, the controller 70 thereby switches the water dispensing limit mode to the water dispensing mode.

Although not illustrated, the locking operation module 31 may include a pair of object detection units having different object detection distances. Using the difference in the object detection distance, a mode switching condition may be set such that the water dispensing limit mode is released under the condition that the user's hand is close to the cover of the locking operation panel 30 but is not in contact with the cover as in the case of the first and second detection units 60A and 60B.

Figure 6:
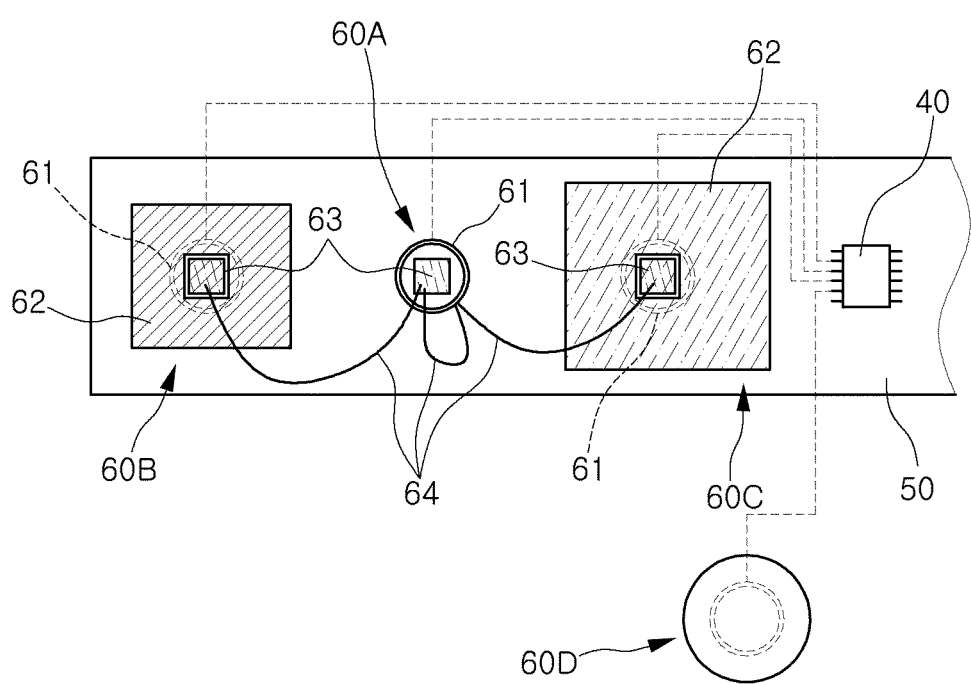
FIG. 6 is a plan view illustrating a water dispensing operation module according to another embodiment of the present disclosure.

Meanwhile, FIG. 6 is related to a water dispensing operation module according to another embodiment of the present disclosure. The embodiment illustrated in FIG. 6 may include the technical features of the embodiment illustrated in FIGS. 2 to 5 as long as it is within a range that does not conflict with the content described below.

As a method of stably forming an object detection distance (see 'a' in FIG. 5) of a first object detection unit 60A that determines a lower limit of an effective object recognition range, an auxiliary receiving pad 63 is located at an end of a support 61 of each of first, second, and third object detection units 60A, 60B, and 60C, and the respective auxiliary receiving pads 63 are connected to the support 61 of the first object detection unit 60A by electric wires 64. At this time, the auxiliary receiving pad 63 may be disposed at the center of the support 61.

Meanwhile, a receiving pad 62 of each of the second object detection unit 60B and the third object detection unit 60C is not in contact with the auxiliary receiving pad 63, with a larger area than the same. Each of the respective receiving pads 62 has a hole formed at a position corresponding to the auxiliary receiving pad 63. At this time, the area of the hole is configured to be larger than that of the auxiliary receiving pad 63 so that the receiving pad 62 is not in contact with the auxiliary receiving pad 63.

Furthermore, a lower limit of an effective object recognition range of the second object detection unit 60B and that of the third object detection unit 60C may be formed to be the same or to be different by adjusting the sizes of the auxiliary receiving pads 63 of the second object detection unit 60B and the third object detection unit 60C.

As each of the auxiliary receiving pads 63 is disposed coaxially with the center of the support 61 of each of the second and third object detection units 60B and 60C, there is an advantage in that an object detection distance of the first object detection unit 60A from a surface of a cover 21 is not eccentric with respect to the center of either of the object detection units 60B and 60C.

Figure 7:
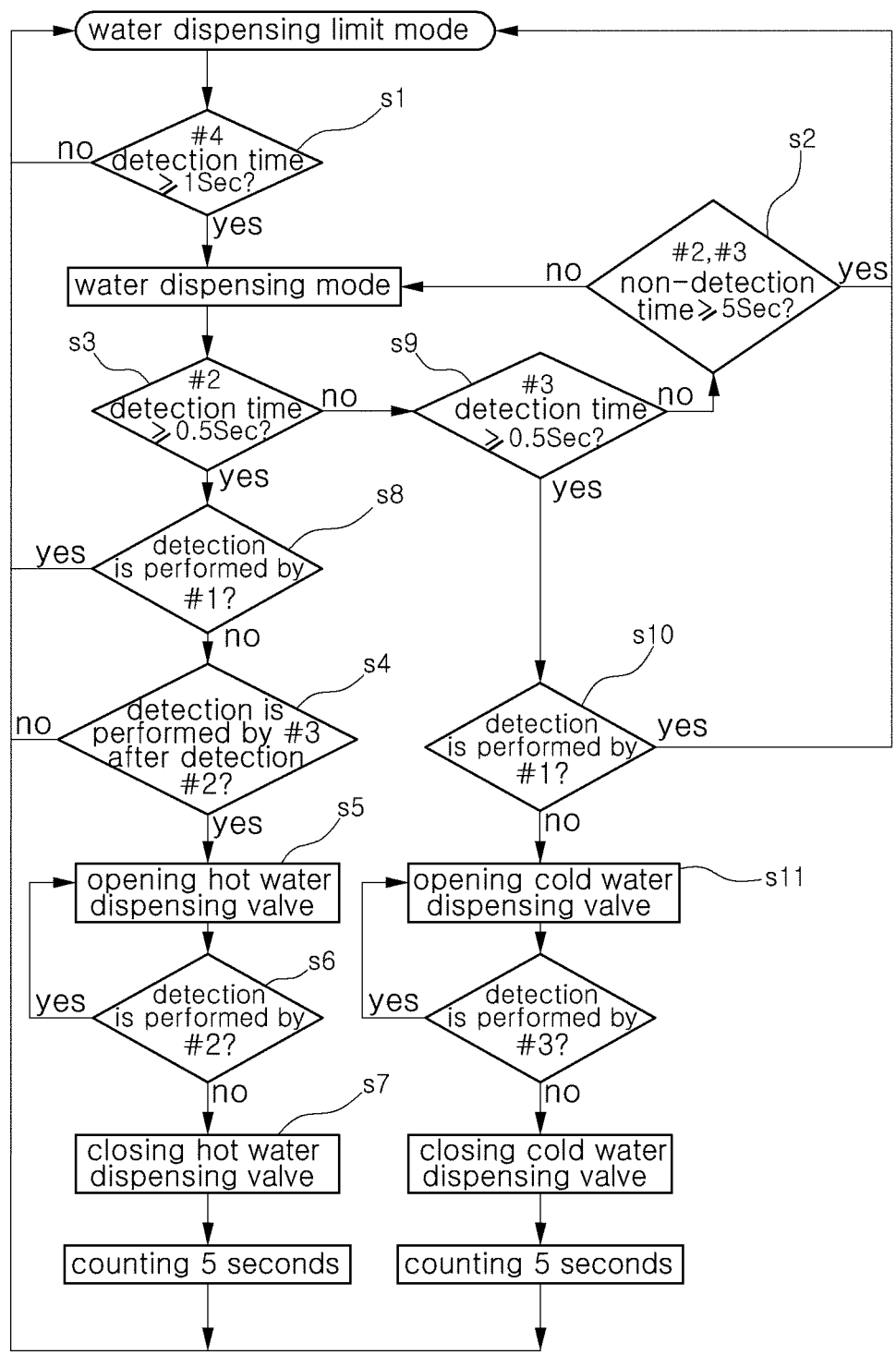
FIG. 7 is a block diagram illustrating a control method of the water supply device illustrated in FIG. 1.
Figure 8A:
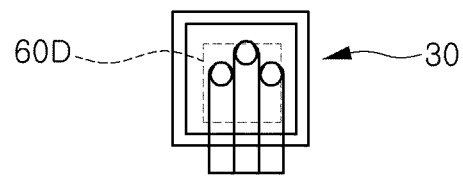
FIGS. 8A, 8B, 8C, 8D, and 8E are views sequentially illustrating a process of dispensing hot water.
Figure 8B:
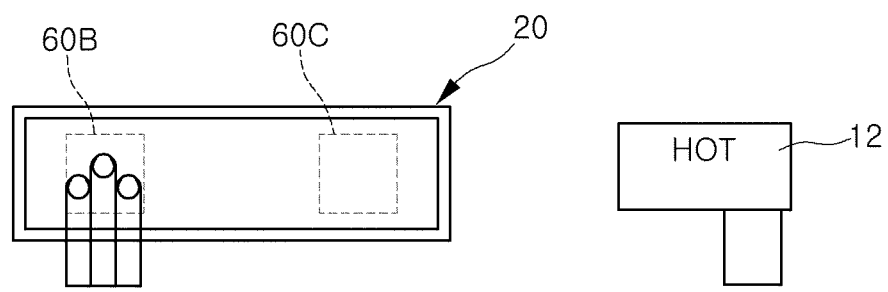
Figure 8C:
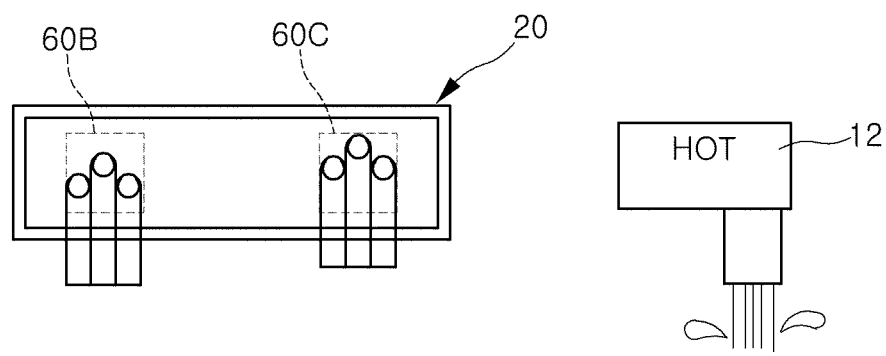
Figure 8D:
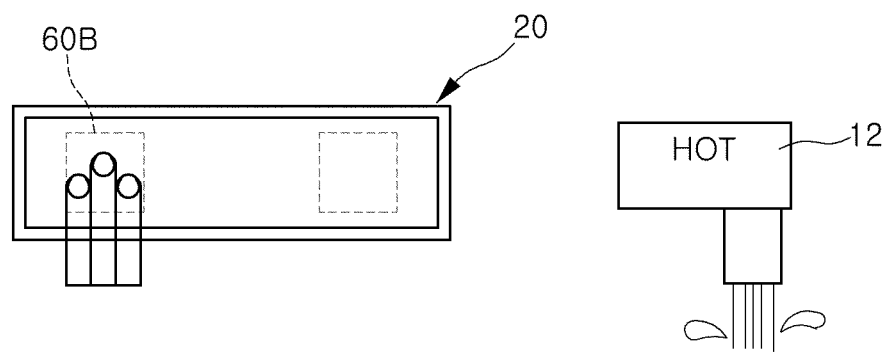
Figure 8E:
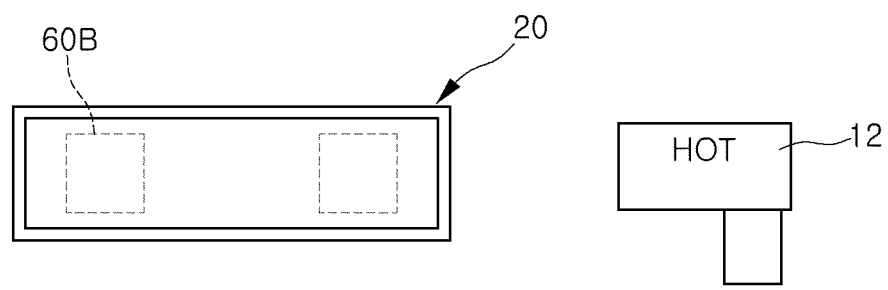

FIGS. 7 to 8E are related to a water dispensing control method according to an embodiment of the present disclosure. In FIG. 7, the first to fourth object detection units are simply represented by #1 to #4. In addition, 'predetermined period of time' presented as a determination condition in the following description may be changed depending on user's setting.

The illustrated water dispensing control method is applied to a touchless water dispensing control system including the above-described at least two water dispensing valves 12, locking operation module 31, water dispensing operation module 22, and controller 70.

A standby state of a water supply device is a water dispensing limit mode.

In the water dispensing limit mode, as a water dispensing operation module 22 is deactivated, water dispensing operation is impossible even if a user makes any gesture in front of the water dispensing operation module 22.

When an object is detected by a fourth object detection unit 60D for equal to or greater than a predetermined period of time (e.g., 1 second), a controller 70 switches the water dispensing limit mode to a water dispensing mode (s1, see FIG. 8A).

After the water dispensing mode is activated, the user is allowed to dispense hot water or cold water by making a specific gesture in front of a water dispensing operation panel 20. At this time, by setting a condition of a gesture pattern for dispensing hot water to be stricter than that for dispensing cold water, unintended hot water dispensing is prevented, leading to improved safety.

When the object is not detected by each of the second and third object detection units 60B and 60C within a predetermined period of time (e.g., 5 seconds) after the water dispensing mode is activated, the controller 70 allows switching to the water dispensing limit mode again (s2).

After releasing the water dispensing limit mode, the user takes a gesture pattern for water dispensing by taking his/her palm or finger close to a front surface of the water dispensing operation panel 20.

The user may take his/her hand or the like close to the second object detection unit 60B for dispensing hot water or the third object detection unit 60C for dispensing cold water.

First, a step of dispensing hot water will be described.

When an object is detected by the second object detection unit 60B for equal to or greater than a predetermined period of time (s3, see FIG. 8B) after the water dispensing mode is activated, and when the object is detected by the third object detection unit 60C (s4), the controller 70 opens the hot water dispensing valve 12 (s5, see FIG. 8C).

At this time, the hot water dispensing valve 12 is maintained in an open state while the object is detected by the second object detection unit 60B, and the hot water dispensing valve 12 is closed when the object is not detected by the second object detection unit 60B (s6, see FIGS. 8B and 8E).

When a predetermined period of time (e.g., 5 seconds) elapses after the user takes his/her hand away from the second object detection unit 60B and thereby the hot water dispensing valve 12 is closed, the water dispensing mode is switched to the water dispensing limit mode (s7).

Meanwhile, when the object is not detected by the third object detection unit 60C within a predetermined period of time (e.g., 5 seconds) after the object is detected by the second object detection unit 60B, the controller 70 allows switching to the water dispensing limit mode (s4).

In other words, when the object is not detected by the third object detection unit 60C within a predetermined period of time after the object is detected by the second object detection unit 60B, hot water dispensing is suppressed and returning to the water dispensing limit mode is allowed. By additionally limiting the detection of the object by the third object detection unit 60C to be performed within a relatively short period of time, a condition for dispensing hot water becomes stricter.

Furthermore, a condition that enforces non-contact with the water dispensing operation panel 20 may be added to this hot water dispensing procedure. In this case, after the object is detected by the second object detection unit 60B, when the object is detected by the first object detection unit 60A having a shorter object detection distance than each of the second and third object detection units 60B and 60C, the controller 70 allows switching to the water dispensing limit mode (s8).

As illustrated in FIG. 5, in a state in which the user's hand or the like touches a cover 21 or approaches the cover 21 close enough to touch the cover 21, and thereby is detected by the first object detection unit 60A having an object detection distance a shorter than an object detection distance b of the second object detection unit 60B, the controller 70 may limit water dispensing by switching the water dispensing mode to the water dispensing limit mode. Furthermore, the controller 70 may display information indicating that switching to the water dispensing limit mode has been made and that a gesture pattern is to be input again without contact with the water dispensing operation panel 20.

When the object is detected by the first object detection unit 60A, the step of switching the water dispensing mode to the water dispensing limit mode by the controller 70 may be performed in a conditionally controlled manner such that switching to the water dispensing limit mode is always possible in a state in which the water dispensing mode is activated. In this case, when the object is detected by the first object detection unit 60A even during normal dispensing of hot water, the controller 70 closes the water dispensing valves 12 and allows switching to the water dispensing limit mode.

Meanwhile, after the water dispensing mode is activated, when the user takes his/her hand or the like close to the third object detection unit 60C, a step of dispensing cold water is performed.

When the object is detected by the third object detection unit 60C for equal to or greater than a predetermined period of time (e.g., 0.5 seconds) after the water dispensing mode is activated (s9), and when the object is not detected by the first object detection unit 60A having a shorter object detection distance than the third object detection unit 60C (s10), the controller 70 opens the cold water dispensing valve 12 while the object is detected by the third object detection unit 60C (s11).

When the user takes his/her hand away from the third object detection unit 60C and thereby the object is no longer detected, the controller 70 closes the cold water dispensing valve 12, waits for a predetermined period of time (e.g., 5 seconds), and then allows switching to the water dispensing limit mode.

According to the water dispensing control method according to the embodiment of the present disclosure, drinking water is dispensed in a touchless manner. In the related art, as a number of users press a water dispensing button, the water dispensing button serves as a medium for spreading pathogens, but in the water supply device 100 according to the present disclosure, this problem is solved because water dispensing proceeds in a touchless manner.

Furthermore, by applying strict conditions on dispensing of hot water, etc., that requires attention in handling, improved safety is ensured.

In detail, in order to dispense water, it is necessary to first release the water dispensing limit mode through the locking operation panel 30 located at a position away from the water dispensing operation panel 20. The locking operation panel 30 and the water dispensing operation panel 20 are not located on the same plane and thus are oriented in different directions, so that water dispensing is prevented from accidentally occurring due to a person or object passing by the water supply device 100.

By requiring sequential approaching two positions in front of the water dispensing operation panel 20 as a condition for dispensing hot water, a gesture pattern for water dispensing is complicatedly set. This prevents accidents in which hot water is dispensed arbitrarily.

Furthermore, by allowing switching to the water dispensing limit mode when the user's hand touches the cover 21 of the water dispensing operation panel 20 directly, this enforces the user to dispense water through a touchless gesture pattern, and prevents water dispensing from accidentally occurring during cleaning with a disinfectant tissue or the like.

Although exemplary embodiments of the present disclosure have been described for illustrative purposes, those skilled in the art will appreciate that various modifications, additions and substitutions are possible, without departing from the scope and spirit of the present disclosure as defined in the accompanying claims.

What is claimed is:

1. A touchless water dispensing operation module installed inside a water dispensing operation panel for water dispensing operation, the water dispensing operation module comprising:
a circuit board on which a touch sensor chip is installed; and
object detection units connected to capacitive input terminals of the touch sensor chip, and erected toward a cover of the water dispensing operation panel,
wherein the object detection units comprises a first object detection unit disposed at an intermediate position, and a second object detection unit and a third object detection unit disposed at left and right sides of the first object detection unit,
wherein an object recognition distance of the first object detection unit from a surface of the cover is shorter than that of the second object detection unit or the third object detection unit from the surface of the cover,
wherein each of the object detection units comprises:
a support oriented toward the cover of the water dispensing operation panel; and
a receiving pad connected to an end of the support, and formed in a surface shape conforming to an inner surface of the cover.

2. The water dispensing operation module of claim 1, further comprising:
a controller connected to the touch sensor chip to receive whether an object is detected by the first to third object detection units, and to evaluate a user's gesture pattern,
wherein when an object is detected by the second object detection unit or the third object detection unit and the object is not detected by the first object detection unit, the controller determines that a correct gesture pattern is detected by the second object detection unit or the third object detection unit; and when the object is detected by the first object detection unit, the controller determines that a gesture pattern is incorrect, regardless of whether the object is detected by the second object detection unit or the third object detection unit.

3. The water dispensing operation module of claim 1, wherein the receiving pad of the first object detection unit has a strip shape extending from a position adjacent to the support of the second object detection unit to the support of the third object detection unit, and the receiving pad of each of the second object detection unit and the third object detection unit is not in contact with the receiving pad of the first object detection unit, with a larger area than the same.

4. The water dispensing operation module of claim 1, wherein an auxiliary receiving pad is located at the end of the support of each of the first, second, and third object detection units, the respective auxiliary receiving pads are connected to the support of the first object detection unit by electric wires, and the receiving pad of each of the second object detection unit and the third object detection unit is not in contact with the auxiliary receiving pad, with a larger area than the same.

* * * * *